United States Patent
Tatenuma et al.

(10) Patent No.: US 8,497,674 B2
(45) Date of Patent: Jul. 30, 2013

(54) MAGNETIC DETECTION APPARATUS

(75) Inventors: Yoshinori Tatenuma, Chiyoda-ku (JP); Hideki Shimauchi, Chiyoda-ku (JP); Masahiro Yokotani, Chiyoda-ku (JP); Yuji Kawano, Chiyoda-ku (JP); Hiroshi Kobayashi, Chiyoda-ku (JE); Kazuyasu Nishikawa, Chiyoda-ku (JP); Manabu Tsukamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 311 days.

(21) Appl. No.: 12/907,599

(22) Filed: Oct. 19, 2010

(65) Prior Publication Data
US 2011/0260724 A1 Oct. 27, 2011

(30) Foreign Application Priority Data
Apr. 22, 2010 (JP) .................... 2010-098769

(51) Int. Cl.
*G01R 33/02* (2006.01)
*G01B 7/30* (2006.01)

(52) U.S. Cl.
USPC .................. 324/207.15; 324/207.21; 324/252

(58) Field of Classification Search
USPC ................... 324/207.15, 207.2, 252
See application file for complete search history.

(56) References Cited

FOREIGN PATENT DOCUMENTS

| JP | 63-188711 A | 8/1988 |
|---|---|---|
| JP | 4-344516 A | 12/1992 |
| JP | 7-005186 A | 1/1995 |
| JP | 2007-155443 A | 6/2007 |
| JP | 2007-192733 A | 8/2007 |
| JP | 2010-032486 A | 2/2010 |

OTHER PUBLICATIONS

Japanese Office Action dated May 1, 2012, issued in corresponding Japanese Patent Application No. 2010-098769.

*Primary Examiner* — Reena Aurora
(74) *Attorney, Agent, or Firm* — Sughrue Mion, PLLC

(57) ABSTRACT

A magnetic detection apparatus includes a first comparison circuit that waveform-shapes the amplitude of a detection signal from magneto-electric transducers by DC coupling, a third comparison circuit that waveform-shapes the detection signal by AC coupling, an oscillation circuit having a natural frequency, a control circuit that counts the output of the first comparison circuit by using the oscillation means, and a selection circuit that selects the output of the first comparison means and the output of the second comparison means. The control circuit counts rising from the next rising or falling from the next falling of an output rectangular wave of the first comparison circuit, and provides output to the selection circuit at the time point at which the count value reaches a desired value. The selection circuit selects and outputs the output rectangular wave of the first comparison circuit or the third comparison circuit.

9 Claims, 14 Drawing Sheets

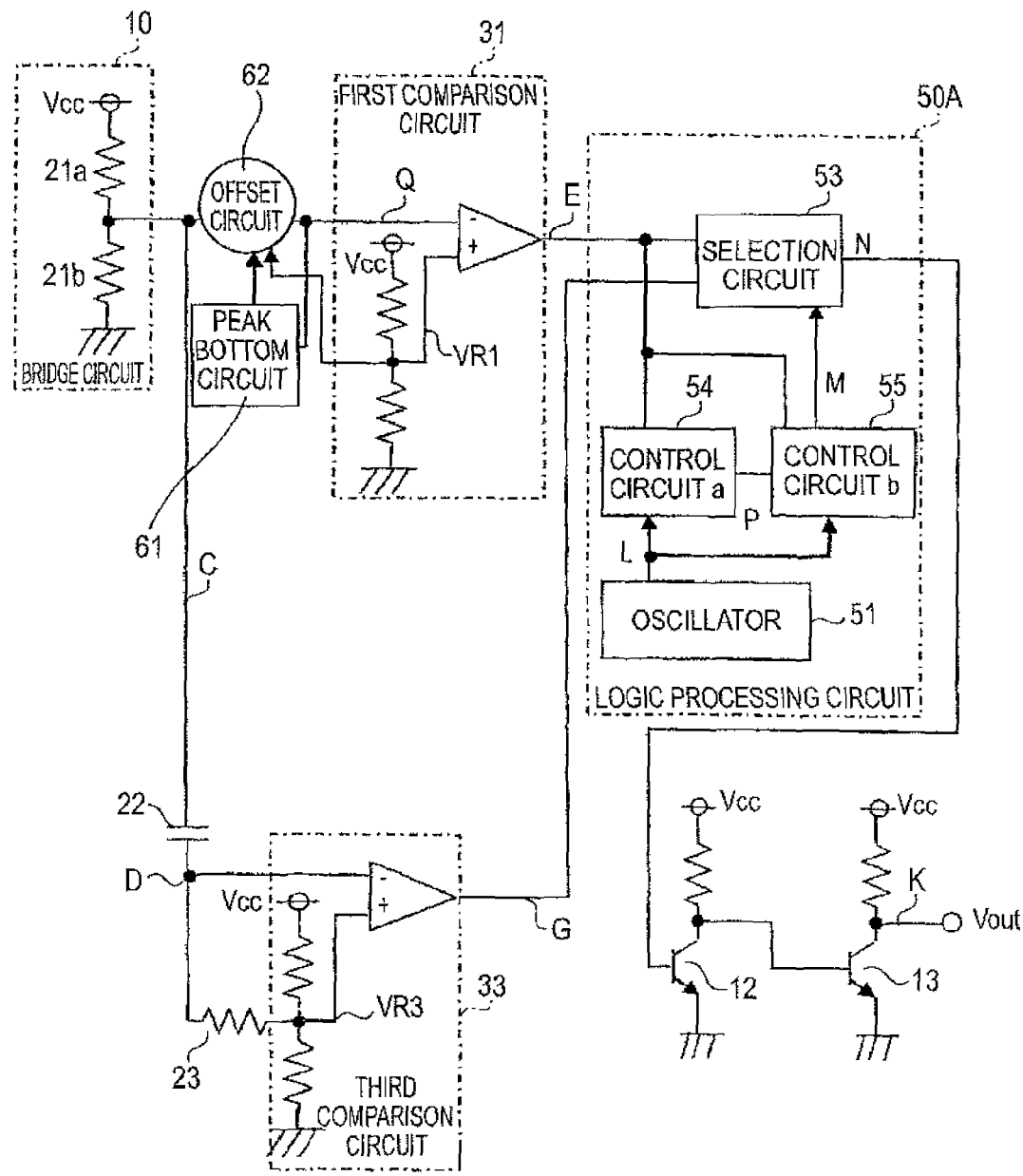

FIG.14A
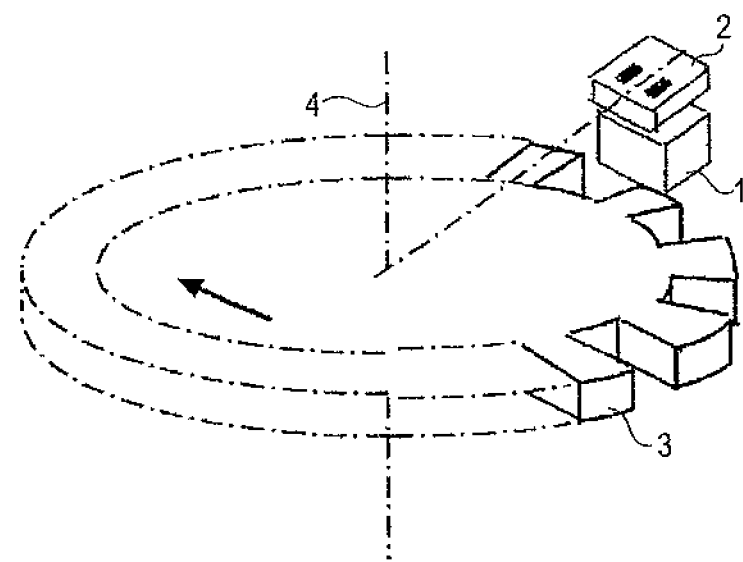
Related Art
FIG.14B
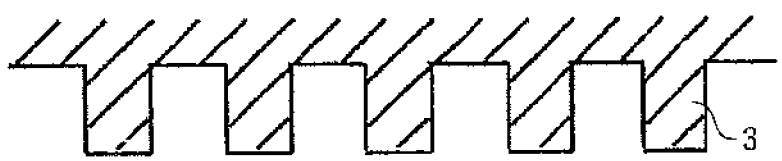
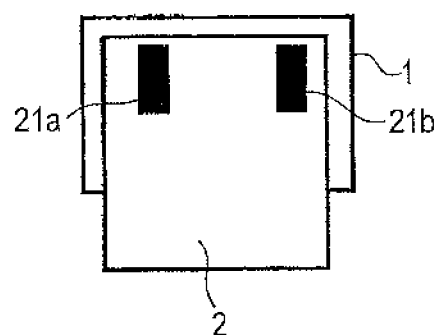
Related Art

Related Art

Related Art

Related Art

MAGNETIC DETECTION APPARATUS

BACKGROUND OF THE INVENTION

1. Field of the Invention

The present invention relates to a magnetic detection apparatus that detects the speed of a moving member by using a magnetic sensor element group.

2. Description of the Related Art

For example, there is a scheme in which a bridge circuit is configured by forming electrodes at each terminal of a magnetic reluctance element (magneto-electric transducer), a power source of a constant voltage and a constant current is connected between two electrodes facing each other in the bridge circuit, variation in a resistance value of the magnetic reluctance element is converted into voltage variation, and variation in a magnetic field applied to the magnetic reluctance element is detected (for example, refer to JP-A-2007-192733).

Hereinafter, the conventional magnetic detection apparatus disclosed in JP-A-2007-192733 will be described with reference to the accompanying drawings.

FIGS. 14A and 14B are schematic diagrams illustrating the configuration of a magnetic circuit of the conventional magnetic detection apparatus, wherein FIG. 14A is a perspective view of the magnetic circuit and FIG. 14B is a top view of the magnetic circuit.

In FIGS. 14A and 14B, the conventional magnetic detection apparatus includes a magnet 1 that generates a bias magnetic field, and a processing circuit unit 2 provided on the magnet 1 and having circuits formed on a board. The processing circuit unit 2 includes an IC chip in which magnetic reluctance elements 21a and 21b serving as a magnetic sensor are integrally formed as segments with each other. The magnetic reluctance elements 21a and 21b, for example, are arranged to face a magnetic moving member 3 having protrusions formed at the peripheral edge of a disc to change the magnetic field, and are arranged in parallel to the movement direction of the magnetic moving member 3. Reference numeral 4 indicates a rotating axis of the magnetic moving member 3, the magnetic moving member 3 rotates in synchronization with the rotation of the rotating axis 4, and the resistance values of the magnetic reluctance elements 21a and 21b change according to the displacement of the magnetic moving member 3.

In addition, in FIGS. 14A and 14B, the magnetic reluctance elements 21a and 21b are shown by one black block, respectively. However, magnetic reluctance elements may be arranged to detect predetermined variation in a magnetic field.

FIG. 15 is a circuit configuration diagram illustrating the configuration of a processing circuit unit of the conventional magnetic detection apparatus using magnetic reluctance elements. FIGS. 16 and 17 are timing charts illustrating operation waveforms according to the processing circuits of FIG. 15, wherein FIG. 16 illustrates operation waveforms of each signal when the rotation number of a magnetic moving member 3 is low, and FIG. 17 illustrates operation waveforms of each signal when the rotation number of the magnetic moving member 3 is high.

In FIG. 15, the conventional magnetic detection apparatus includes a bridge circuit 10, a first comparison circuit 31, a second comparison circuit 32, a third comparison circuit 33, a logic processing circuit 34, transistors 12 and 13 for output, and an output terminal Vout. The bridge circuit 10 configures a sensor that detects magnetic field strength, and includes two magnetic reluctance elements 21a and 21b serving as a magneto-electric transducer. As described above, in the bridge circuit 10, the resistance values of the magnetic reluctance elements 21a and 21b change according to the displacement of the magnetic moving member 3, resulting in the variation in the voltage of a detection signal C of the bridge circuit 10.

The detection signal C of the bridge circuit 10 is input to the first comparison circuit 31 and the second comparison circuit 32, and is also input to the third comparison circuit 33 through a high-pass filter including a capacitor 22 and a resistor 23.

The first comparison circuit 31 has a first comparison level VR1, waveform-shapes the amplitude of the detection signal C by DC coupling, and outputs a rectangular wave signal E.

The second comparison circuit 32 has a second comparison level VR2 different from the first comparison level VR1, waveform-shapes the amplitude of the detection signal C by the DC coupling, and outputs a rectangular wave signal F.

The third comparison circuit 33 has a third comparison level VR3 between the first comparison level VR1 and the second comparison level VR2, waveform-shapes the amplitude of the detection signal C after AC coupling, and outputs a rectangular wave signal G.

Hereinafter, the first to third comparison levels VR1 to VR3 will be simply referred to as "comparison levels", respectively.

The detection signal C is converted into the rectangular wave signal E through a comparison with the comparison level VR1 in the first comparison circuit 31, and is converted into the rectangular wave signal F through a comparison with the comparison level VR2 in the second comparison circuit 32. Further, the detection signal C is converted into a voltage signal D after the AC processing through the high-pass filter including the capacitor 22 and the resistor 23, and then is converted into the rectangular wave signal G through a comparison with the comparison level VR3 in the third comparison circuit 33.

The output signals E to G of the first to third comparison circuits 31 to 33 are logically processed by the logic processing circuit 34, and then are output as a final output signal K through the transistors 12 and 13.

The logic processing circuit 34 includes a first transistor 41 and a third transistor 43 serially inserted between a supply voltage VCC and a ground, a second transistor 42 and a fourth transistor 44 serially inserted between the supply voltage VCC and the ground, and a fifth transistor 45 inserted between the supply voltage VCC and the ground. The logic processing circuit 34 inputs the output signal of the second transistor 42 to the transistor 12 for output as the final output signal.

Hereinafter, the first to fifth transistors 41 to 45 will be simply referred to as "transistors", respectively.

The transistor 41 is turned on and off by the output signal E of the first comparison circuit 31, and the transistor 42 is turned on and off by the output signal of the transistor 41. The transistor 43 is serially connected to the transistor 41 and is turned on and off by the output signal G of the third comparison circuit 33. The transistor 45 is turned on and off by the output signal F of the second comparison circuit 32. The transistor 44 is serially connected to the transistor 42 and is turned on and off by the output signal of the transistor 45.

That is, the transistor 41 has an emitter terminal connected to a collector terminal of the transistor 43, a collector terminal (an output terminal) connected to a base terminal of the transistor 42 while being connected to the supply voltage VCC through a resistor, and a base terminal that receives the rectangular wave signal E. Further, the transistor 42 has a base terminal connected to the output terminal of the transistor 41, an emitter terminal connected to the collector terminal of the transistor 44, and a collector terminal (an output terminal) connected to the supply voltage VCC through a resistor and serving as the final output terminal.

In addition, the transistor 45 has an emitter terminal connected to the ground, a collector terminal (an output terminal) connected to a base terminal of the transistor 44 while being connected to the supply voltage VCC through a resistor, and a base terminal that receives the rectangular wave signal F. Moreover, the transistor 44 has an emitter terminal connected to the ground, a collector terminal connected to the emitter terminal of the transistor 42.

In the logic processing circuit 34 having the above configuration, the transistors 41 and 43 configure an inversion input-type AND gate, the transistors 42 and 44 configure an inversion input-type AND gate, and the transistor 45 configures an inverter.

In addition, the transistors 12 and 13 for output configure an amplifier for amplifying the final output signal K.

Accordingly, the final output signal K has a logic level varying depending on the combination of the logic levels of the output signals E to G of the first to third comparison circuits 31 to 33 as shown in (1) to (8) below. Herein, "H" indicates a high level of the rectangular wave signal and "L" indicates a low level of the rectangular wave signal.

(1) when E, G and F are "H, H and H", K="H"
(2) when E, G and F are "H, H and L", K="H"
(3) when E, G and F are "H, L and H", K="H"
(4) when E, G and F are "H, L and L", K="L"
(5) when E, G and F are "L, H and H", K="H"
(6) when E, G and F are "L, H and L", K="L"
(7) when E, G and F are "L, L and H", K="H"
(8) when E, G and F are "L, L and L", K="L"

FIG. 16 illustrates operation waveforms of signals C' to G', and K' when the magnetic moving member 3 is in a low rotation state, and FIG. 17 illustrates operation waveforms of signals C to G, and K when the magnetic moving member 3 is in a high rotation state.

In the case of the low rotation, single quotes are attached to each signal. That is, the detection signal C becomes C', the voltage signal D after the AC processing becomes D', the rectangular wave signal E becomes E', the rectangular wave signal G becomes G', the rectangular wave signal F becomes F', and the final output signal K becomes K'.

In FIG. 16, as apparent from the combination of the voltage level "H and L" of the signals E', F', G' and K', the rising timing "L→H" of the final output signal K' at the time of the low rotation is the same as the rising timing of the rectangular wave signal E' from the first comparison circuit 31.

Further, the falling timing "H→L" of the final output signal K' is the same as the falling timing of the rectangular wave signal F' from the second comparison circuit 32.

Meanwhile, in FIG. 17, the rising timing and the falling timing of the final output signal K at the time of the high rotation are the same as the rising timing and the falling timing of the rectangular wave signal G from the third comparison circuit 33, respectively. That is, when the magnetic moving member 3 is in the low rotation state, the output signals E and F after the DC processing from the first comparison circuit 31 and the second comparison circuit 32 are used. When the magnetic moving member 3 is in the high rotation state, the output signal G after the AC processing from the third comparison circuit 33 is used.

At this time, since the phase difference between the rectangular signals E and F after the DC processing from the first comparison circuit 31 and the second comparison circuit 32 and the rectangular signal G after the AC processing from the third comparison circuit 33 is always equal to or less than ¼ period, the final output signal K can be achieved without any difficulty regardless of the rotation states of the magnetic moving member 3. Further, the switching timing of the case of applying the DC processing of the first comparison circuit 31 and the second comparison circuit 32 and the case of applying the AC processing of the third comparison circuit 33 can be arbitrarily set by adjusting the circuit constant of the capacitor 22 and the resistor 23 constituting the high-pass filter.

However, in the conventional apparatus disclosed in JP-A-2007-192733 as described above, as shown in FIG. 18, when the detection signal C is shifted upward and exceeds the comparison level VR2, the rising timing of the final output signal K is the same as the rising timing of the rectangular wave signal E from the first comparison circuit 31. Further, the falling timing of the final output signal K is the same as the falling timing of the rectangular wave signal G from the third comparison circuit 33.

Therefore, in the conventional magnetic detection apparatus as shown in FIG. 18, when the shift amount of the detection signal C is large, it may be difficult to determine setting values of the comparison levels VR1 to VR3 and to detect the accurate position of an object to be detected.

SUMMARY OF THE INVENTION

In view of the above, it is an object of the present invention to provide a magnetic detection apparatus capable of detecting the accurate position of an object to be detected even if the shift amount of a detection signal is large because temperature offset occurs in variation in the voltage of magneto-electric transducers due to variation in the temperature coefficient of the magneto-electric transducers, variation in the strength of a magnetic field applied to the magneto-electric transducers, and the like.

According to an aspect of the invention, there is provided a magnetic detection apparatus provided with a sensor including magneto-electric transducers for detecting a magnetic field, the magnetic detection apparatus including: a first comparison means that waveform-shapes a detection signal from the magneto-electric transducers by DC coupling; a second comparison means that waveform-shapes the detection signal from the magneto-electric transducers by AC coupling; an oscillation means having a natural frequency; a control means that counts output of the first comparison means or output of the second comparison means by using the oscillation means; and a selection means that selects the output of the first comparison means and the output of the second comparison means in response to a count value of the control means.

In accordance with the magnetic detection apparatus according to the present invention, even when large variation occurs in the output of magneto-electric transducers due to variation in a temperature coefficient of the magnetic reluctance elements, variation in the strength of a magnetic field applied to the magnetic reluctance elements, and the like, the position of an object to be detected can be accurately detected regardless of the shift amount of the detection signal.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 10 is a flow diagram illustrating an output selection state of a first comparison circuit and a third comparison circuit in a magnetic detection apparatus according to a third embodiment of the present invention;

FIG. 11 is a circuit configuration diagram illustrating processing circuits of a magnetic detection apparatus according to a fourth embodiment of the present invention;

FIGS. 14A and 14B are schematic diagrams illustrating the configuration of a magnetic circuit of the conventional magnetic detection apparatus

DESCRIPTION OF PREFERRED EMBODIMENT

First Embodiment

Hereinafter, a magnetic detection apparatus according to the first embodiment of the present invention will be described with reference to the accompanying drawings.

Figure 1:
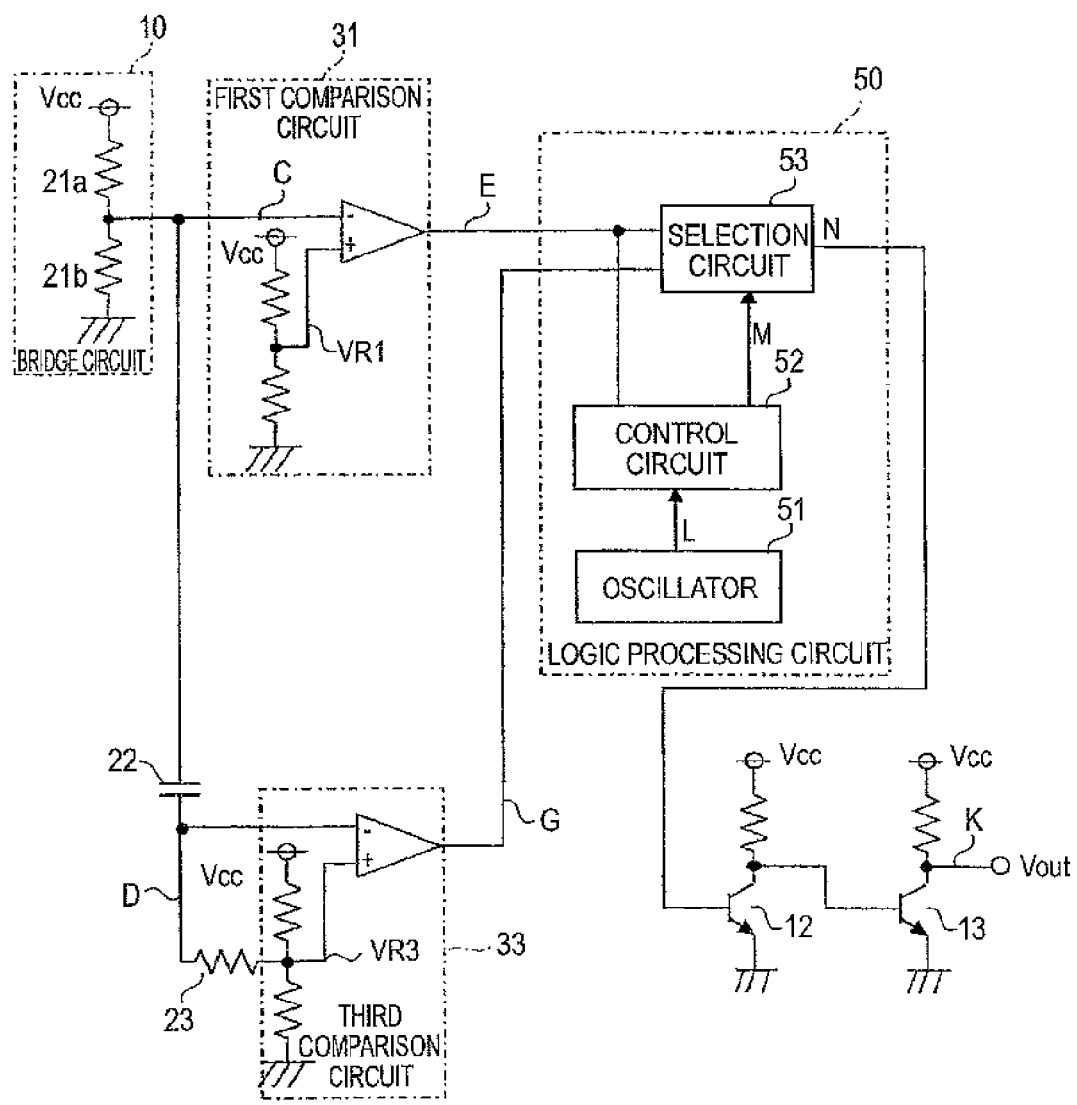
FIG. 1 is a circuit configuration diagram illustrating processing circuits of a magnetic detection apparatus according to a first embodiment of the present invention.
Figure 2:
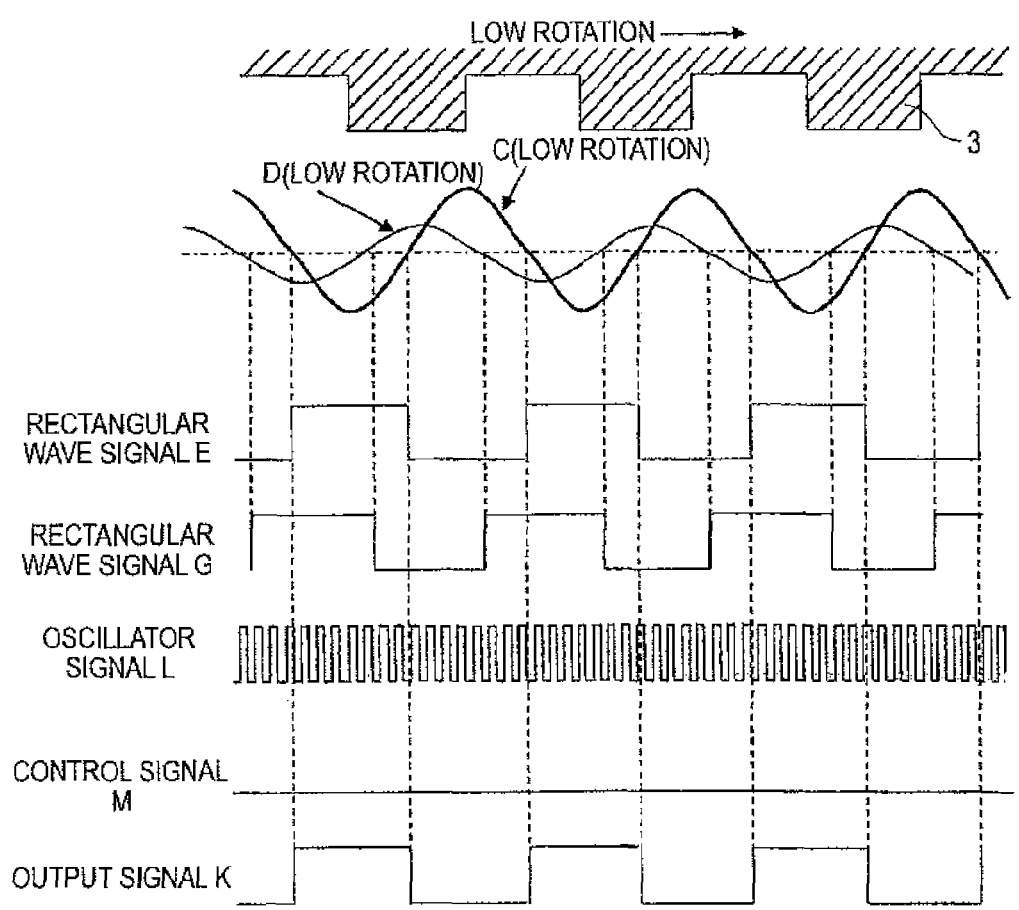
FIG. 2 is a timing chart illustrating operation waveforms at the time of low rotation of a magnetic moving member in a magnetic detection apparatus according to a first embodiment of the present invention.
Figure 3:
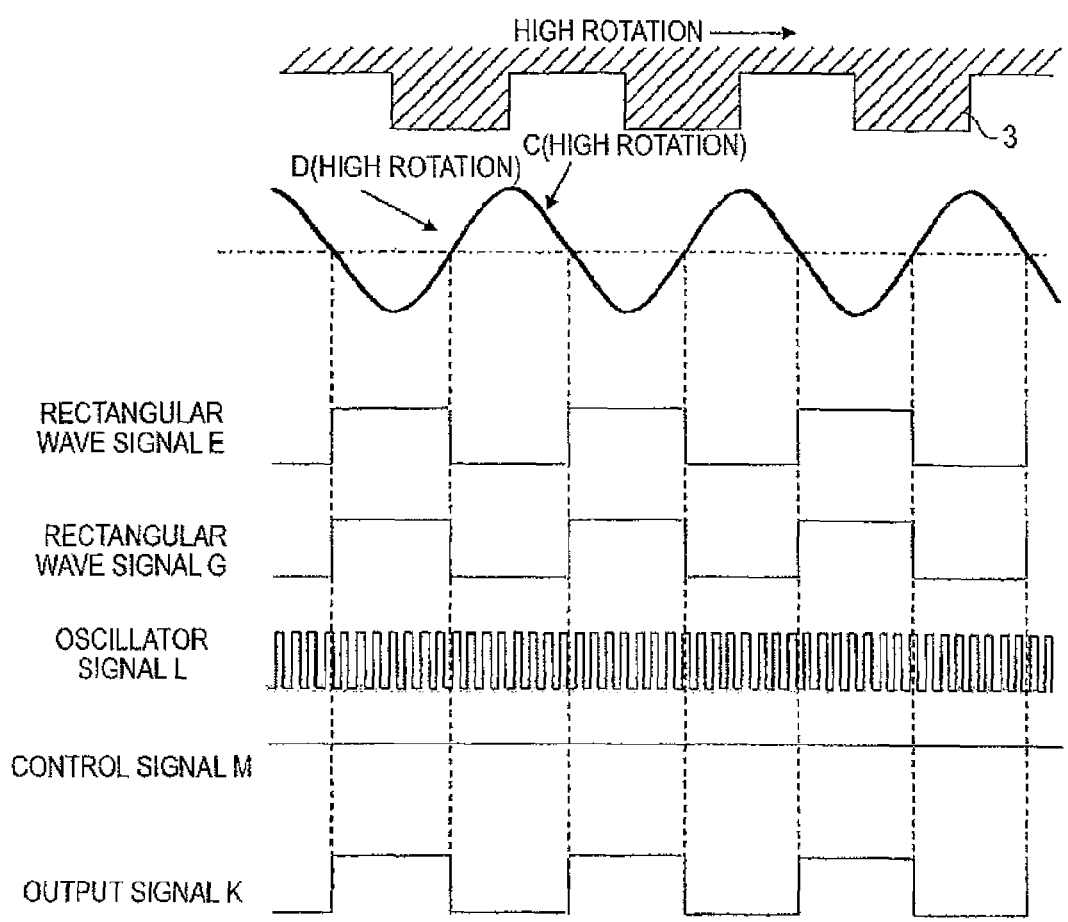
FIG. 3 is a timing chart illustrating operation waveforms at the time of high rotation of a magnetic moving member in a magnetic detection apparatus according to a first embodiment of the present invention.
Figure 15:
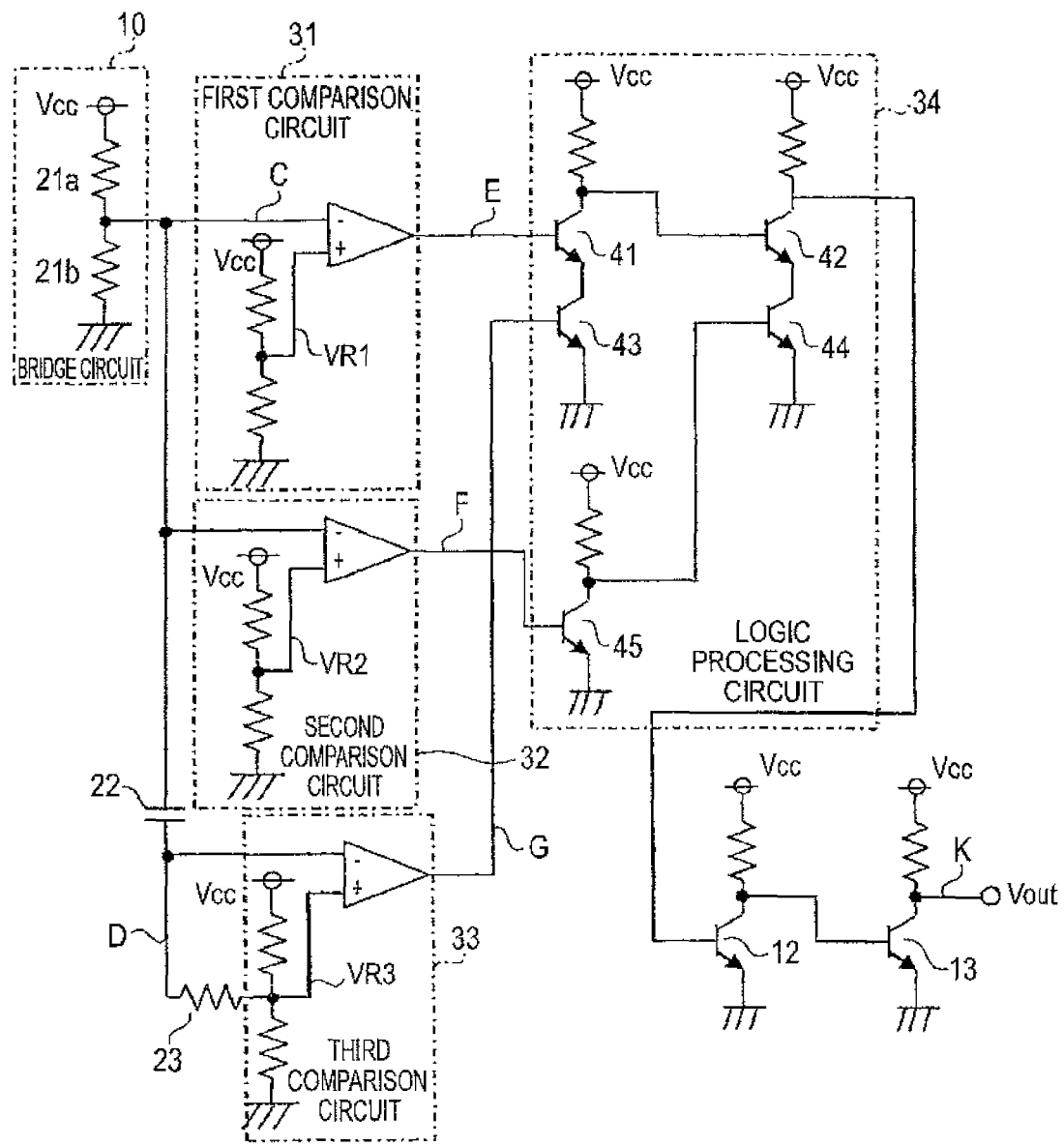
FIG. 15 is a circuit configuration diagram illustrating the configuration of processing circuits of the conventional magnetic detection apparatus.
Figure 16:
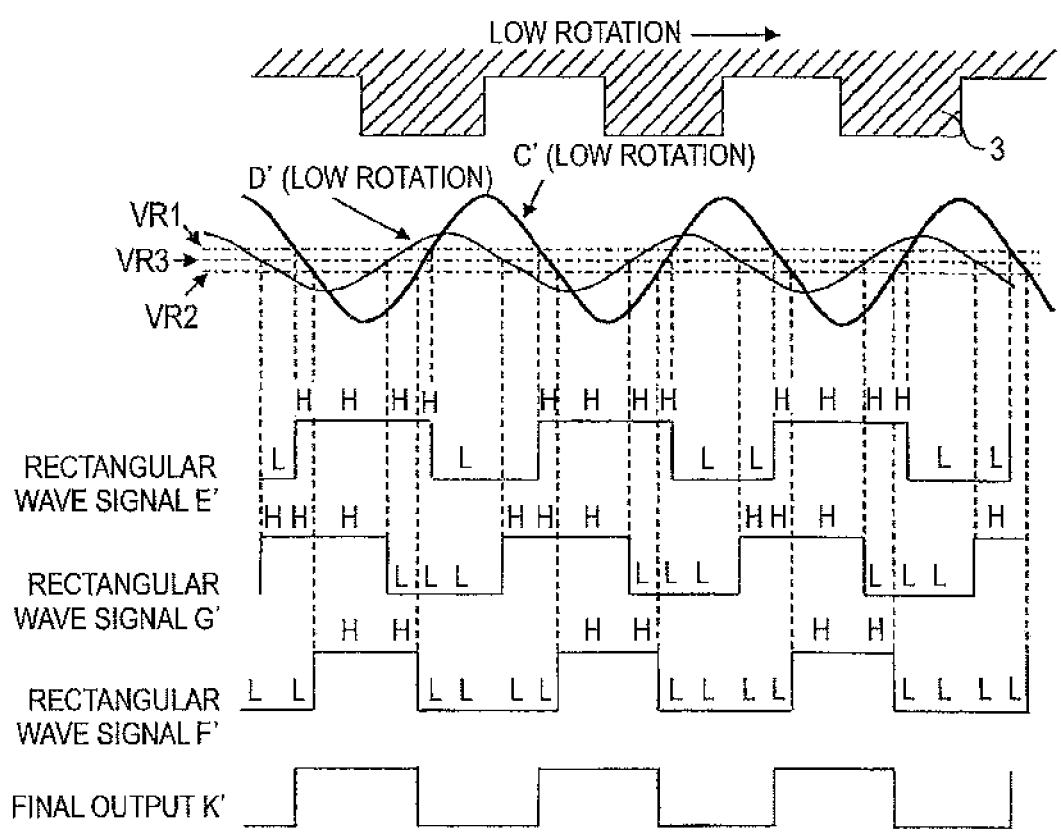
FIG. 16 is a timing chart illustrating operation waveforms of the conventional magnetic detection apparatus.
Figure 17:
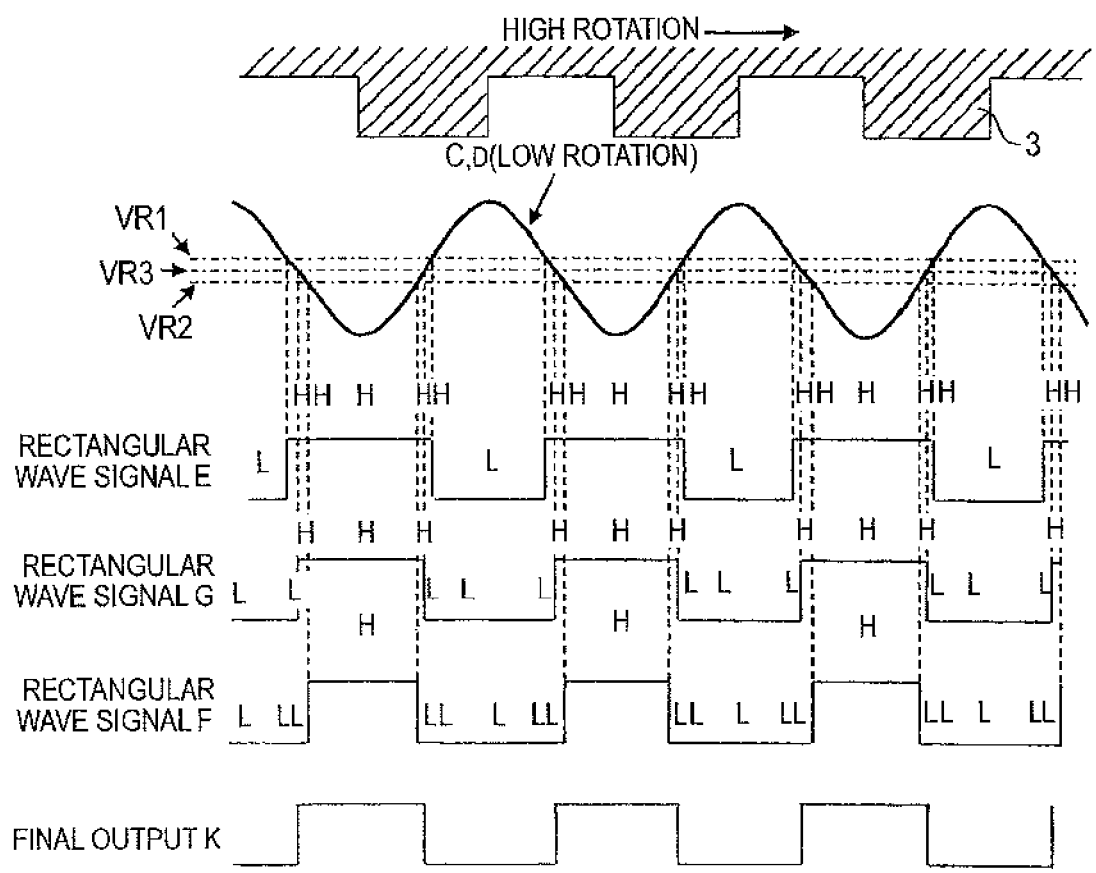
FIG. 17 is a timing chart illustrating operation waveforms of the conventional magnetic detection apparatus.
Figure 18:
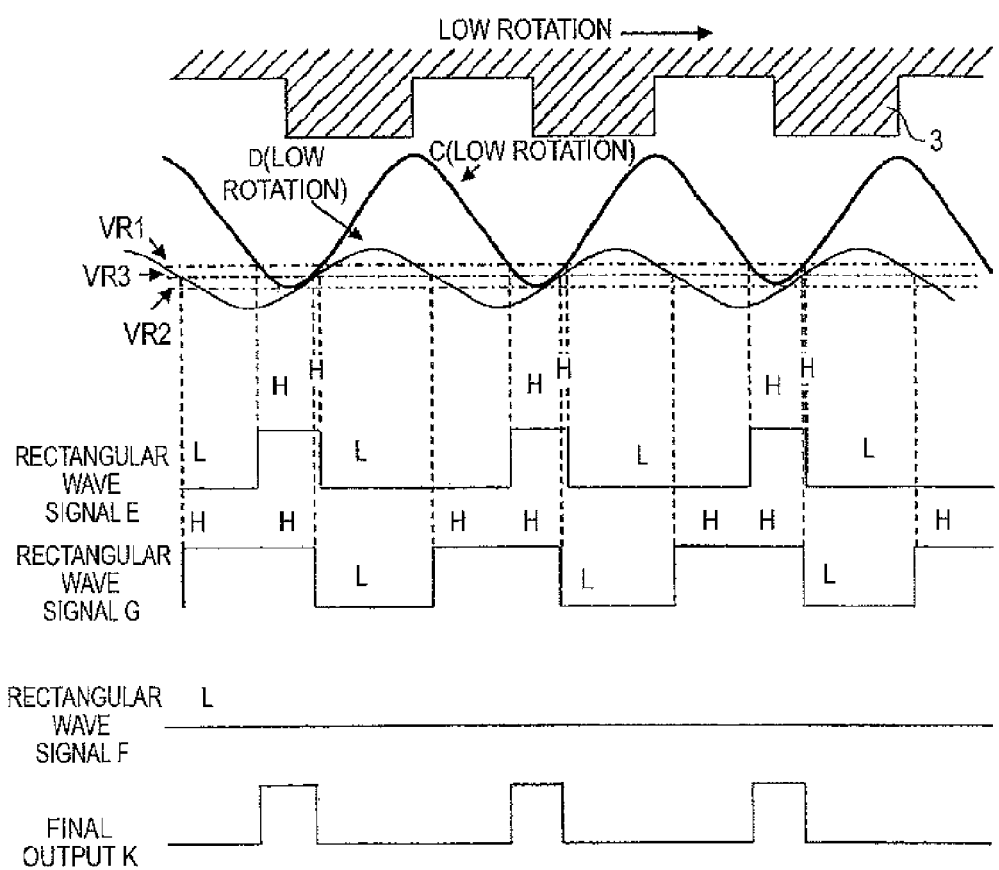
FIG. 18 is a timing chart illustrating operation waveforms when the shift amount of a detection signal is large in the conventional magnetic detection apparatus.

FIG. 1 is a circuit configuration diagram illustrating the configuration of a processing circuit unit of the magnetic detection apparatus according to the first embodiment of the present invention, and the same reference numerals are used to designate elements the same as or similar to those of the conventional diagram (refer to FIG. 15). FIGS. 2 and 3 are timing charts illustrating operation waveforms according to the processing circuits of FIG. 1, wherein FIG. 2 illustrates operation waveforms of each signal when the rotation number of a magnetic moving member 3 is low, and FIG. 3 illustrates operation waveforms of each signal when the rotation number of the magnetic moving member 3 is high.

Further, the configuration of a sensor unit including magnetic reluctance elements 21a and 21b is the same as that shown in FIG. 14.

In FIG. 1, the magnetic detection apparatus according to the first embodiment of the present invention includes a bridge circuit 10, a first comparison circuit 31, a third comparison circuit 33, a logic processing circuit 50, transistors 12 and 13 for output, and an output terminal Vout. The bridge circuit 10 configures a sensor that detects magnetic field strength, and includes the two magnetic reluctance elements 21a and 21b serving as a magneto-electric transducer. In the bridge circuit 10, the resistance values of the magnetic reluctance elements 21a and 21b change according to the displacement of the magnetic moving member 3, resulting in the variation in the voltage of a detection signal C of the bridge circuit 10. The detection signal C of the bridge circuit 10 is input to the first comparison circuit 31, and is also input to the third comparison circuit 33 through a high-pass filter including a capacitor 22 and a resistor 23.

The first comparison circuit 31 has a first comparison level VR1, waveform-shapes the amplitude of the detection signal C by the DC coupling, and outputs a rectangular wave signal E.

The third comparison circuit 33 has a third comparison level VR3, waveform-shapes the amplitude of the detection signal C after the AC coupling, and outputs a rectangular wave signal G.

The detection signal C is converted into the rectangular wave signal E through a comparison with the first comparison level VR1 in the first comparison circuit 31, is converted into a voltage signal D after AC processing through the high-pass filter including the capacitor 22 and the resistor 23, and then is converted into the rectangular wave signal G through a comparison with the third comparison level VR3 in the third comparison circuit 33.

The output signals E and G of the first and third comparison circuits 31 and 33 are logically processed by the logic processing circuit 50, and then are output as a final output signal K through the transistors 12 and 13.

The logic processing circuit 50 includes an oscillator 51 having a natural oscillation frequency, a control circuit 52 and a selection circuit 53.

An output signal L of the oscillator 51 is input to the control circuit 52. The control circuit 52 counts from the rising to the next rising or from the falling to the next falling of the rectangular wave signal E of the first comparison circuit 31 by using an oscillation signal L. When the count value exceeds a desired count value, the control circuit 52 outputs a control signal M at a low level. Further, when the count value is equal to or less than the desired count value, the control circuit 52 outputs a control signal M at a high level.

FIGS. 2 and 3 illustrate the operation waveforms when the control signal M is at the low level and the high level.

When the control signal M at the low level is output from the control circuit 52, the selection circuit 53 selects the output of the rectangular wave signal E of the first comparison circuit 31. Further, when the control signal M at the high level is output from the control circuit 52, the selection circuit 53 selects the output of the rectangular wave signal G of the third comparison circuit 33.

Figure 4:
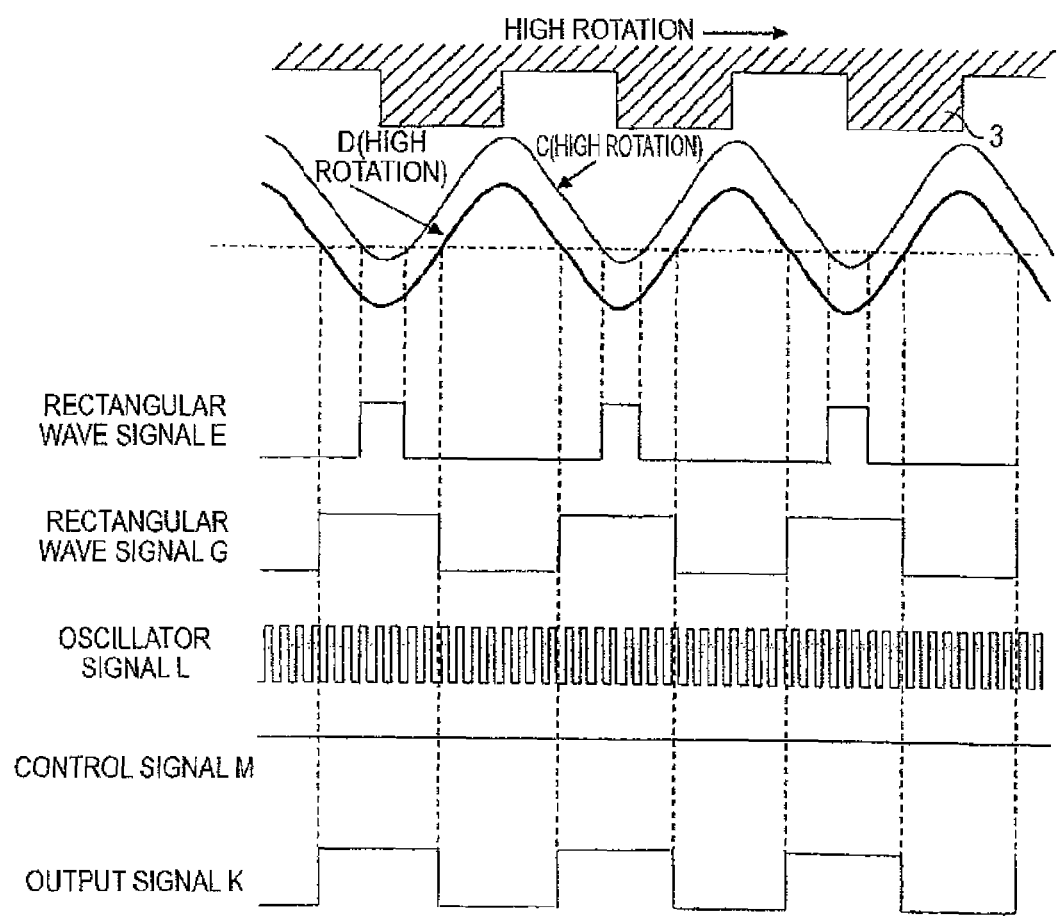
FIG. 4 is a timing chart illustrating operation waveforms when temperature offset occurs in variation in a voltage of a detection signal in a magnetic detection apparatus according to a first embodiment of the present invention.

FIG. 4 illustrates the operation waveforms when temperature offset occurs in variation in the voltage of the detection signal C due to variation in a temperature coefficient of the magnetic reluctance elements 21a and 21b, variation in the strength of a magnetic field applied to the magnetic reluctance elements 21a and 21b, and the like.

In FIG. 4, the first comparison level VR1 of the first comparison circuit 31 and the third comparison level VR3 of the third comparison circuit 33 are set to have the same value. Even if voltage offset of the detection signal C is large, the rectangular wave signal E can be output so long as the voltage offset is detected by one comparison level (i.e., the comparison level VR1).

The magnetic moving member 3 may have a tooth shape or may also have a magnetization pattern. Further, the magnetic moving member 3 may be a rotating member or a linear member. That is, the magnetic moving member 3 may be a moving member having a movement direction arbitrarily determined.

Further, the sensor element may be a magneto-electric transducer such as a hall element, a magnetic reluctance (MR) element, a giant magnetic reluctance (GMR) element and a tunnel type magnetic reluctance (TMR) element.

Furthermore, for the AC processing, the high-pass filter is used. However, a low-pass filter may also be used.

The magnetic detection apparatus according to the first embodiment of the present invention includes a first comparison means that waveform-shapes a detection signal from the magneto-electric transducers by DC coupling, a second comparison means that waveform-shapes the detection signal from the magneto-electric transducers by AC coupling, an oscillation means having a natural frequency, a control means that counts output of the first comparison means or output of the second comparison means by using the oscillation means, and a selection means that selects the output of the first comparison means and the output of the second comparison means in response to the count value of the control means, wherein the control means counts a time width of an output rectangular wave of the first comparison means or a time width of an output rectangular wave of the second comparison means by using the oscillation means, and outputs a determination result to the selection means when it is determined that the counted time width is a desired time width.

Consequently, even when variation in a temperature coefficient of the magnetic reluctance elements is large or variation in the strength of a magnetic field applied to the magnetic reluctance elements is large, if the variation is detected by one comparison level, any one of rectangular wave signals after AC coupling or DC coupling can be selected and output, and the position of an object to be detected can be accurately detected regardless of the shift amount of the detection signal.

Second Embodiment

Figure 5:
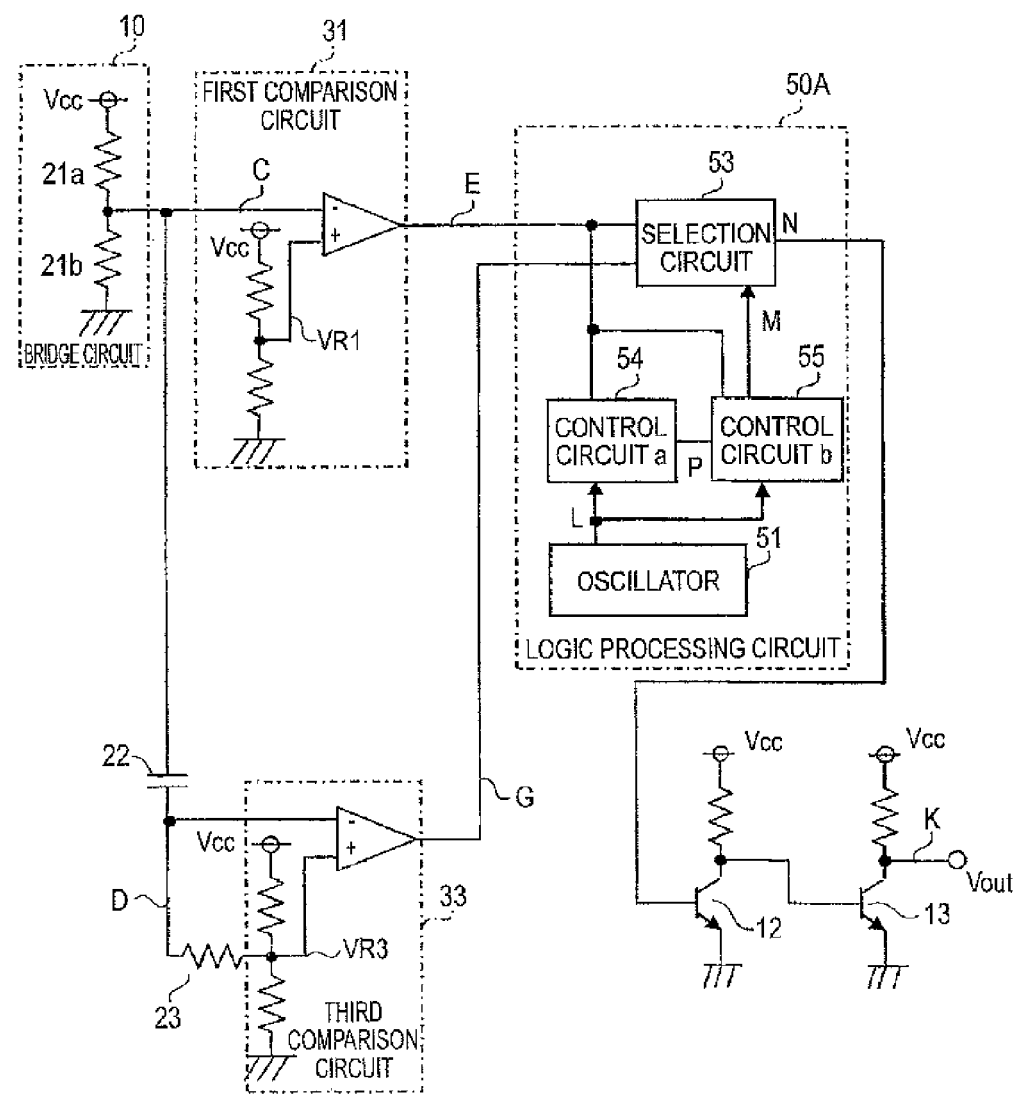
FIG. 5 is a circuit configuration diagram illustrating processing circuits of a magnetic detection apparatus according to a second embodiment of the present invention.

FIG. 5 is a diagram illustrating the configuration of a processing circuit unit of a magnetic detection apparatus according to the second embodiment of the present invention, and the same reference numerals are used to designate elements the same as or similar to those of FIG. 1.

In FIG. 5, the magnetic detection apparatus according to the second embodiment of the present invention includes the bridge circuit 10, the first comparison circuit 31, the third comparison circuit 33, a logic processing circuit 50A, the transistors 12 and 13 for output, and the output terminal Vout. The magnetic detection apparatus has a circuit configuration the same as that of the magnetic detection apparatus according to the first embodiment, except for the logic processing circuit 50A, and performs a circuit operation the same as that of the magnetic detection apparatus according to the first embodiment.

In FIG. 5, the output signals E and G of the first and third comparison circuits 31 and 33 are logically processed by the logic processing circuit 50A, and then are output as a final output signal K through the transistors 12 and 13. The logic processing circuit 50A includes an oscillator 51 having a natural oscillation frequency, a control circuit a54, a control circuit b55 and a selection circuit 53.

An output signal L of the oscillator 51 is input to the control circuit a54 and the control circuit b55.

The control circuit a54 counts from the falling to the next falling or from the rising to the next rising of the rectangular wave signal E of the first comparison circuit 31 by using the oscillation signal L. When the count value exceeds a desired count value, the control circuit a54 outputs a control signal P at a low level. Further, when the count value is equal to or less than the desired count value, the control circuit a54 outputs a control signal P at a high level.

An output signal P of the control circuit a54 is input to the control circuit b55.

The control circuit b55 counts from the falling to the next falling or from the rising to the next rising of the rectangular wave signal E of the first comparison circuit 31. When the count value exceeds the desired count value and the output signal P of the control circuit a54 is at the low level, the control circuit b55 outputs a control signal M at a low level.

Further, when the count value is equal to or less than the desired count value and the output signal P of the control circuit a54 is at the high level, the control circuit a54 outputs the control signal M at a high level.

However, when the count value exceeds the desired count value and the output signal P of the control circuit a54 is at the high level, the control circuit b55 outputs the control signal M at the high level. Further, when the count value is equal to or less than the desired count value and the output signal P of the control circuit a54 is at the low level, the control circuit a54 outputs the control signal M at the low level.

Figure 6:
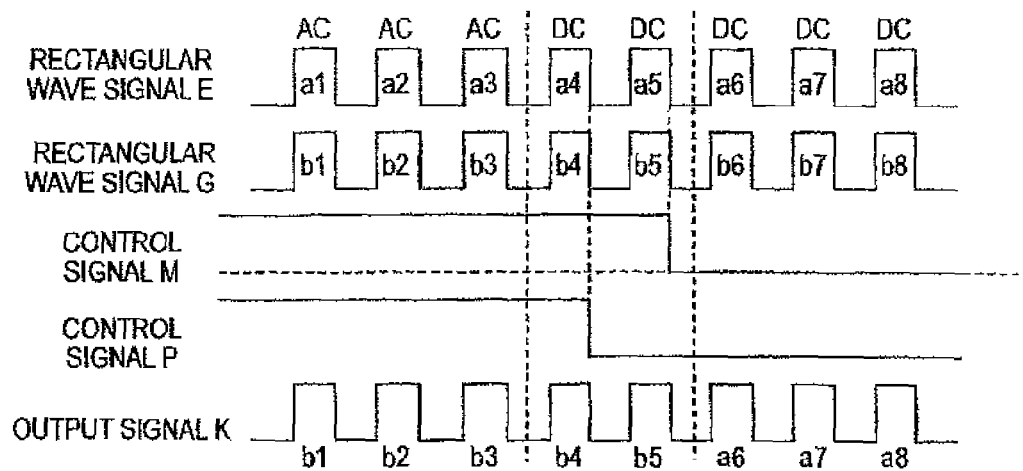
FIG. 6 is a waveform diagram explaining switching of a rectangular wave signal of a first comparison circuit and a rectangular wave signal of a third comparison circuit in a logic circuit according to a second embodiment of the present invention.
Figure 7:
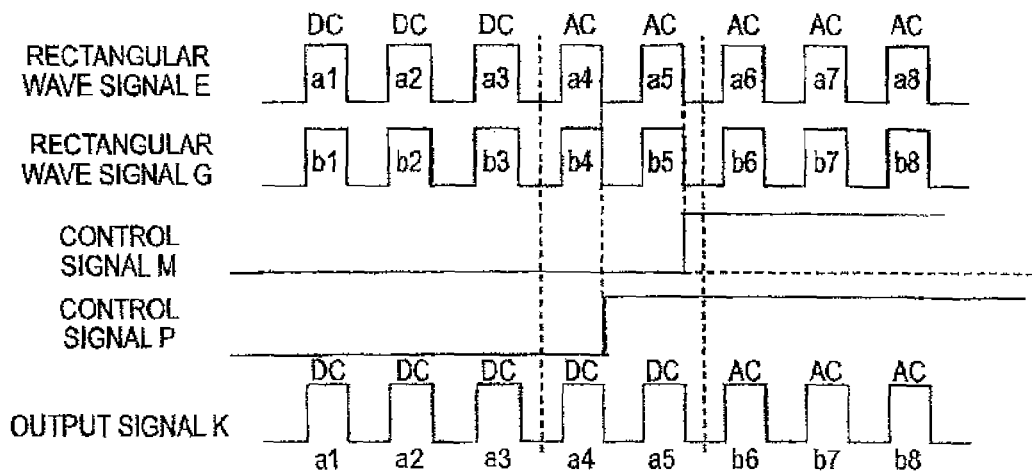
FIG. 7 is a waveform diagram explaining switching of a rectangular wave signal of a first comparison circuit and a rectangular wave signal of a third comparison circuit in a logic circuit according to a second embodiment of the present invention.

FIGS. 6 and 7 are diagrams explaining switching of the logic processing circuit 50A with respect to the rectangular wave signal E of the first comparison circuit 31 and the rectangular wave signal G of the third comparison circuit 33.

For the purpose of convenience, a portion of the rectangular wave signal, which exceeds the desired count value by the oscillation signal L, will be referred to as "DC", and a portion of the rectangular wave signal, which is less than the desired count value, will be referred to as "AC".

In FIGS. 6 and 7, the DC and the AC are attached to the rectangular wave signals. Further, for the purpose of convenience, "a1", "b1" and the like are attached to each waveform of the rectangular wave signals E, G and K.

FIG. 6 illustrates the switching operation from the AC to the DC.

Since the rectangular wave signal E is switched into the DC at a4, the control signal P is changed from the high level to the low level at the timing just before a5 after a4 of the rectangular wave signal E.

Further, since the rectangular wave signal E is continued with the DC at a5, the control signal M is changed from the high level to the low level at the timing just before a6 after a5 of the rectangular wave signal E. Consequently, in the output signal K, the signal of a6 is output at the timing just before b6 after b5. That is, the output signal K is output in such a manner that the signal of a6 is output after the DC indicated by b4 and b5 is continued twice.

FIG. 7 illustrates the switching operation from the DC to the AC.

Since the rectangular wave signal E is switched into the AC at a4, the control signal P is changed from the low level to the high level at the timing just before a5 after a4 of the rectangular wave signal E.

Further, since the rectangular wave signal E is continued with the AC at a5, the control signal M is changed from the low level to the high level at the timing just before a6 after a5 of the rectangular wave signal E. Consequently, in the output signal K, the signal of b6 is output at the timing just before a6 after a5. That is, the output signal K is output in such a manner that the signal of b6 is output after the AC indicated by a4 and a5 is continued twice.

Figure 8:
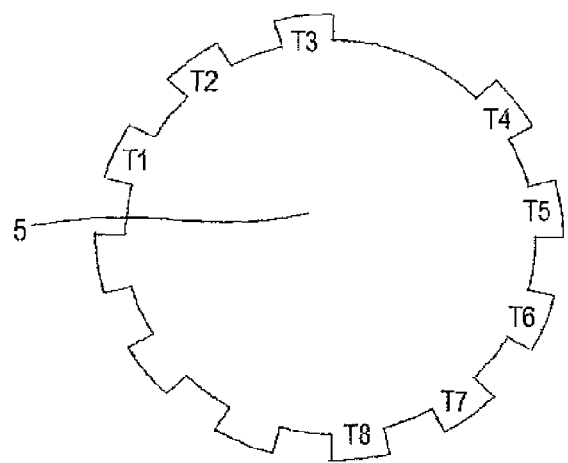
FIG. 8 is a top view of a magnetic moving member in a magnetic detection apparatus according to a second embodiment of the present invention.

FIG. 8 is a top view of the magnetic moving member 5. The magnetic moving member 5 is a general magnetic moving member mounted on a vehicle to detect the rotation number. In FIG. 8, "T1" to "T8" are attached to protrusions formed at the peripheral edge of a disc.

In the magnetic moving member 5 shown in FIG. 8, the tooth between T3 and T4 has been extracted. The extraction of the tooth allows the angle of every one rotation of the magnetic moving member 5 to be detected.

Figure 9:
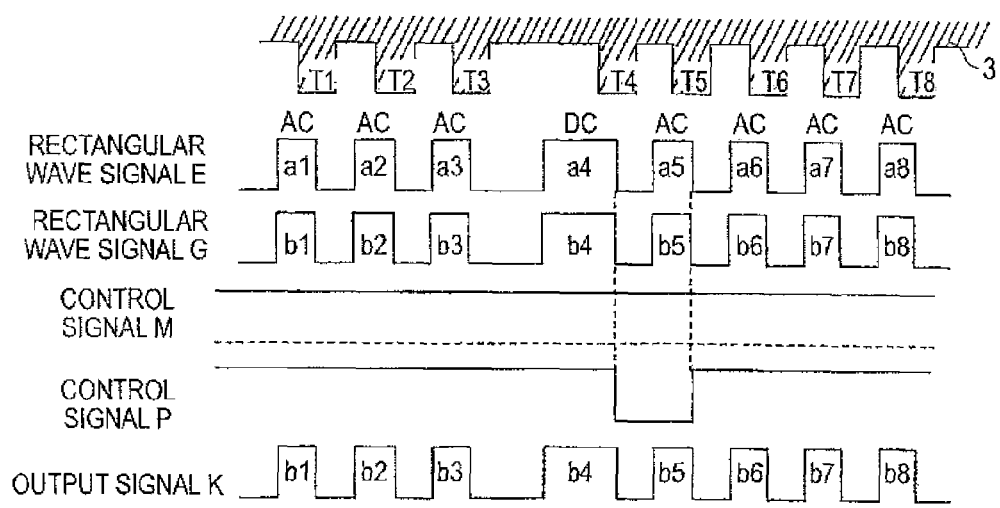
FIG. 9 is an operation waveform diagram when using a magnetic moving member of FIG. 8 in a magnetic detection apparatus according to a second embodiment of the present invention.

FIG. 9 is an operation waveform diagram of the second embodiment using the magnetic moving member 5 of FIG. 8. The magnetic moving member 5 rotates around the number rotation number at which switching of AC and DC is performed. Since the tooth between T3 and T4 of the magnetic moving member 5 has been extracted, the rectangular wave signal E is in an AC state at a3. However, the rectangular wave signal E is switched into the DC at a4, and then is switched into the AC at a5. As described in FIGS. 5 to 7, in the magnetic detection apparatus according to the second embodiment, the output signal K is output in synchronization with the output of the rectangular wave signal G, for example, in the sequence of b1, b2, b3, b4, b5, b6, b7 and b8. Even in the case of the rotation number around the rotation number for determining the switching of AC and DC, there is no output of the rectangular wave signal E in which the tooth extraction part (between T3 and T4) is in a DC state.

The magnetic detection apparatus according to the present invention is configured as mentioned above. Therefore, in relation to the rotation number around the rotation number set for the switching of AC and DC, when the magnetic moving member has the tooth extraction part, there is no exchange (chattering) of the rectangular wave signal E and the rectangular wave signal G.

Third Embodiment

Hereinafter, a magnetic detection apparatus according to the third embodiment of the present invention will be described with reference to the accompanying drawings.

The processing circuit unit of the magnetic detection apparatus according to the third embodiment of the present invention has a configuration the same as that of FIG. 1 according to the first embodiment. That is, the magnetic detection apparatus according to the third embodiment of the present invention includes a bridge circuit 10, a first comparison circuit 31, a third comparison circuit 33, a logic processing circuit 34, transistors 12 and 13 for output, and an output terminal Vout. The magnetic detection apparatus performs a circuit operation the same as that of the magnetic detection apparatus according to the first embodiment, except for a control circuit 52.

In FIG. 1, the output signal L of the oscillator 51 is input to the control circuit 52.

The control circuit 52 counts from the falling to the next falling or from the rising to the next rising of the rectangular wave signal E of the first comparison circuit 31 by using the oscillation signal L. The control circuit 52 has two values A and B which are obtained by frequency-converting the desired count value.

The frequency-conversion indicates a reciprocal of the counted time width.

In the case in which the selection circuit 53 selects the rectangular wave signal E of the first comparison circuit 31, when the count value reaches the frequency value A, the control circuit 52 allows the control signal M to be changed from the low level to the high level. Further, in the case in which the selection circuit 53 selects the rectangular wave signal G of the third comparison circuit 33, when the count value reaches the frequency value B, the control circuit 52 allows the control signal M to be changed from the high level to the low level.

FIG. 10 is a flow diagram illustrating the state in which the selection circuit 53 of the magnetic detection apparatus according to the third embodiment selects the output of the first comparison circuit 31 and the output of the third comparison circuit 33.

In FIG. 10, the frequency value A is set to be larger than the frequency value B. Consequently, hysteresis may be added to the switching frequency of the first comparison circuit 31 and the third comparison circuit 33 by the selection circuit 53.

As described above, in accordance with the magnetic detection apparatus according to the third embodiment of the present invention, in relation to the rotation number around the rotation number set for the switching of AC and DC, there is no exchange (chattering) of the rectangular wave signal E and the rectangular wave signal G due to minute increase and decrease in the rotation number of the magnetic moving member.

Fourth Embodiment

Figure 12:
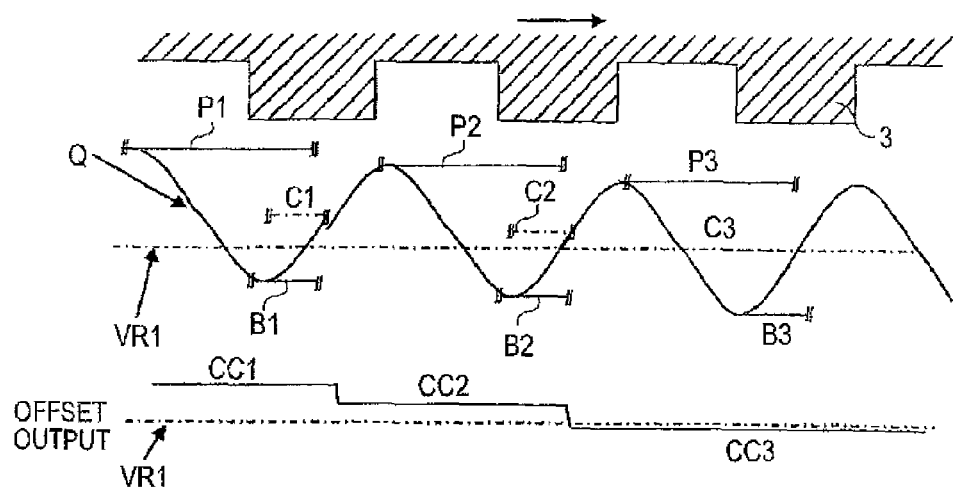
FIG. 12 is an operation waveform diagram in a magnetic detection apparatus according to a fourth embodiment of the present invention.
Figure 13:
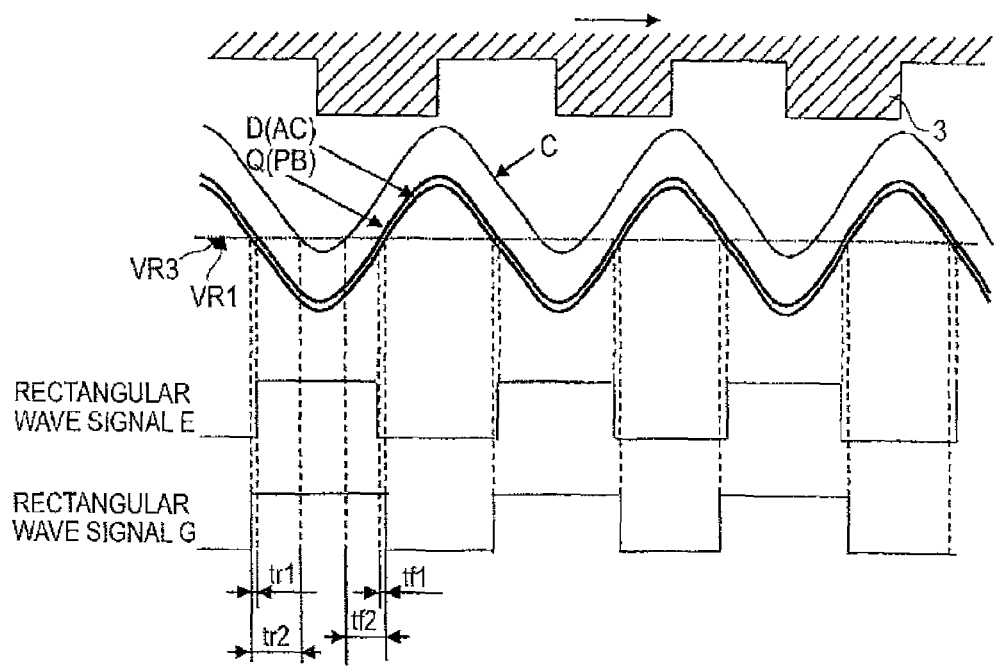
FIG. 13 is an operation waveform diagram in a magnetic detection apparatus according to a fourth embodiment of the present invention.

FIG. 11 is a diagram illustrating the configuration of a processing circuit unit of a magnetic detection apparatus according to the fourth embodiment of the present invention, and FIGS. 12 and 13 are diagrams illustrating the operation waveforms of a peak-bottom circuit and an offset circuit in the magnetic detection apparatus according to the fourth embodiment.

In FIG. 11, the magnetic detection apparatus according to the fourth embodiment of the present invention includes the bridge circuit 10, the first comparison circuit 31, the third comparison circuit 33, the logic processing circuit 50A, the transistors 12 and 13 for output, the output terminal Vout, the peak-bottom circuit 61 and the offset circuit 62. The magnetic detection apparatus has a circuit configuration the same as that of the magnetic detection apparatus according to the second embodiment, except for the peak-bottom circuit 61 and the offset circuit 62, and performs an operation the same as that of the magnetic detection apparatus according to the second embodiment.

The peak-bottom circuit 61 outputs a value (P+B)/m, which is obtained by dividing the sum (P+B) of a peak value P and a bottom value B of an inputted bridge signal C into m, to the offset circuit 62. Herein, m is an arbitrary numerical value.

Further, the offset circuit 62 performs desired digital offset on the bridge signal C such that the value (P+B)/m and the voltage value VR1 approximate each other, thereby outputting a signal Q.

In addition, the peak-bottom circuit 61 and the offset circuit 62 may be reset using the rectangular wave signal E, the oscillator 51, or both of them.

FIG. 12 illustrates the transition state of convergence of the signal Q according to the operation of the peak-bottom circuit 61 and the offset circuit 62. In FIG. 12, m has a value of 2 (m=2).

The peak-bottom circuit 61 performs a reset operation at a desired timing to achieve a value, which is obtained by averaging a peak value P1 and a bottom value B1 of the next signal C, that is, a value C1 (=(P1+B1)/2).

The value C1 is output to the offset circuit 62. The offset circuit 62 adds a desired digital offset value CC2 to the signal C such that the value C1 approximates the voltage value VR1.

In the same manner, the peak-bottom circuit 61 performs a reset operation at a desired timing to achieve a value, which is obtained by averaging a peak value P2 and a bottom value B2 of the next signal C, that is, a value C2 (=(P2+B2)/2). The value C2 is output to the offset circuit 62. The offset circuit 62 adds a desired digital offset value CC3 to the signal C such that the value C2 approximates the voltage value VR1.

In this way, at the time point at which the signal having the offset value added thereto finally approximates the value of the first comparison level VR1 of the first comparison circuit 31 in a digital manner as much as possible, the offset circuit 62 stops the digital offset addition to the signal C and holds the offset value of the previous time.

FIG. 13 illustrates the state in which the digital offset addition is held by the operations of the peak-bottom circuit 61 and the offset circuit 62, that is, a convergent state. The first comparison level VR1 of the first comparison circuit 31 and the third comparison level VR3 of the third comparison circuit 33 have the same value.

In FIG. 13, tr1 indicates the time difference between the rising edge of the rectangular wave signal E and the rising edge of the rectangular wave signal G, and tf1 indicates the time difference between the falling edge of the rectangular wave signal E and the falling edge of the rectangular wave signal G. Further, tr2 and tf2 indicate the time difference from the time point, at which the bridge signal C intersects the comparison level of the comparison level VR1, to the rising and falling of the rectangular wave signal G. In FIG. 13, tr1 is smaller than tr2 and tf1 is smaller than tf2. Consequently, both the time difference between the rising and the falling of the rectangular wave signal E and the time difference between the rising and the falling of the rectangular wave signal G are smaller than the time difference between the rising and the falling of a rectangular wave signal, which are output from the first comparison circuit by DC-coupling the bridge signal C in the case of not including the peak-bottom circuit and the offset circuit, and the time difference between the rising and the falling of the rectangular wave signal G.

In accordance with the magnetic detection apparatus according to the fourth embodiment of the present invention, since the time difference between the rising of the rectangular wave signal of the first comparison circuit 31 and the rising of the rectangular wave signal of the third comparison circuit 33 is small and the time difference between the falling of the rectangular wave signal of the first comparison circuit 31 and the falling of the rectangular wave signal of the third comparison circuit 33 is small, even if the rectangular wave signal of the first comparison circuit 31 is switched into the rectangular wave signal of the third comparison circuit 33 by the selection circuit 53 or the rectangular wave signal of the third comparison circuit 33 is switched into the rectangular wave signal of the first comparison circuit 31 by the selection circuit 53, the time difference between the rising positions of the rectangular wave signals and the time difference between the falling positions of the rectangular wave signals can be reduced, and variation in the detection accuracy of the magnetic detection apparatus due to the switching can be suppressed as much as possible.

Various modifications and alterations of this invention will be apparent to those skilled in the art without departing from the scope and spirit of this invention, and it should be understood that this is not limited to the illustrative embodiments set forth herein.

What is claimed is:

1. A magnetic detection apparatus provided with a sensor including magneto-electric transducers for detecting a magnetic field, the magnetic detection apparatus comprising:
    a first comparison means that waveform-shapes a detection signal from the magneto-electric transducers by DC coupling;
    a second comparison means that waveform-shapes the detection signal from the magneto-electric transducers by AC coupling;
    an oscillation means having a natural frequency;
    a control means that counts output of the first comparison means or output of the second comparison means resulting in a count value by using the oscillation means; and
    a selection means that selects the output of the first comparison means and the output of the second comparison means in response to the count value obtained by the control means.

2. The magnetic detection apparatus according to claim 1, wherein the control means counts a time width of an output rectangular wave of the first comparison means or a time width of an output rectangular wave of the second comparison means by using the oscillation means, and outputs a determination result to the selection means when it is determined that the counted time width is a desired time width.

3. The magnetic detection apparatus according to claim 2, wherein, after the counted time width is determined as the desired time width, when regarding from rising to next falling or next rising of the output rectangular wave of the first comparison means or the second comparison means as one time, or counts from the falling to the next rising or the next falling of the output rectangular wave of the first comparison means or the second comparison means one time, the control means outputs the determination result to the selection means by an output rectangular wave of the first comparison means or the second comparison means after one time or more and N times.

4. The magnetic detection apparatus according to claim 2, wherein, when the control means sets a first value to a frequency A and a second value to a frequency B, the frequency A and the frequency B have values different from each other, the first value being obtained by converting the time width of the output rectangular wave, in which the selection means switches selection to the second comparison means from the first comparison means, into a frequency, and the second value being obtained by converting the time width of the output rectangular wave, in which the selection means switches selection to the first comparison means from the second comparison means, into a frequency.

5. The magnetic detection apparatus according to claim 4, wherein the frequency A is larger than the frequency B.

6. The magnetic detection apparatus according to claim 1, further comprising:

a peak-bottom means, provided between the magneto-electric transducers and the first comparison means, having, a peak hold means to hold a peak value of the detection signal from the magneto-electric transducers, and a bottom hold means to hold a bottom value of the detection signal from the magneto-electric transducers, that outputs a desired value by the peak value and the bottom value; and an offset generation means that applies an offset value to the detection signal by the value output from the peak-bottom means.

7. The magnetic detection apparatus according to claim 6, wherein the value output from the peak-bottom means is an average value of the peak value and the bottom value.

8. The magnetic detection apparatus according to claim 1, wherein the magneto-electric transducers include magnetic reluctance elements.

9. The magnetic detection apparatus according to claim 1, wherein the magneto-electric transducers include giant magnetic reluctance elements (GMR elements).

* * * * *